(12) United States Patent
Voss et al.

(10) Patent No.: US 10,446,825 B2
(45) Date of Patent: Oct. 15, 2019

(54) CLOSURE SYSTEM FOR THE ELECTROLYTE FILL PORT OF AN ELECTROCHEMICAL CELL

(71) Applicant: Greatbatch Ltd., Clarence, NY (US)

(72) Inventors: Gregory A. Voss, Alden, NY (US); Tina L. Urso, East Amherst, NY (US); Kenneth B. Talamine, Plymouth, MN (US)

(73) Assignee: Greatbatch Ltd., Clarence, NY (US)

( * ) Notice: Subject to any disclaimer, the term of this patent is extended or adjusted under 35 U.S.C. 154(b) by 81 days.

(21) Appl. No.: 15/834,724

(22) Filed: Dec. 7, 2017

(65) Prior Publication Data
US 2018/0159113 A1 Jun. 7, 2018

Related U.S. Application Data

(60) Provisional application No. 62/431,039, filed on Dec. 7, 2016.

(51) Int. Cl.
H01M 2/36 (2006.01)
H01M 2/02 (2006.01)
(Continued)

(52) U.S. Cl.
CPC ......... H01M 2/365 (2013.01); H01M 2/0202 (2013.01); H01M 2/0217 (2013.01);
(Continued)

(58) Field of Classification Search
CPC .. H01M 2/365; H01M 2/0202; H01M 2/0217; H01M 2/0285; H01M 2/0426; H01M 2/06; H01M 2/361; H01M 2/367
See application file for complete search history.

(56) References Cited

U.S. PATENT DOCUMENTS 3,736,190 A * 5/1973 Dey et al. ............... H01M 2/02
220/327
6,610,443 B2 8/2003 Paulot et al.
(Continued)

FOREIGN PATENT DOCUMENTS

JP 11154506 6/1999
JP 2001313022 11/2001
(Continued)

Primary Examiner — Jayne L Mershon
(74) Attorney, Agent, or Firm — Michael F. Scalise (57) ABSTRACT

A closure system for the electrolyte fill port of an electrochemical cell is described. A cell header has an electrolyte fill port comprising an upper opening sidewall extending from a header upper surface to an intermediate ledge located part-way through the header thickness. The ledge extends from a lower edge of the upper opening sidewall to an upper edge of a lower opening sidewall, the lower opening sidewall extending to the header lower surface. With respect to an axis of the electrolyte fill port, the upper opening sidewall has a first radius $r_1$ and the lower opening sidewall has a second radius $r_2$ at the ledge, the lower opening sidewall extending downwardly and inwardly along the axis from the second radius $r_2$ to a third radius $r_3$ at the header lower surface. The second radius $r_2$ at the ledge is greater than the third radius $r_3$ at the header lower surface. A closure system for an electrolyte fill port comprises a lower closure member secured to the lower opening sidewall by a lower weld; and an upper closure member secured to the upper opening sidewall by an upper weld. Importantly, the lower opening sidewall is provided with rifling.

24 Claims, 8 Drawing Sheets

(51) Int. Cl.
  *H01M 2/04* (2006.01)
  *H01M 2/06* (2006.01)
(52) U.S. Cl.
  CPC ....... *H01M 2/0285* (2013.01); *H01M 2/0426* (2013.01); *H01M 2/06* (2013.01); *H01M 2/361* (2013.01); *H01M 2/367* (2013.01); *H01M 2002/0297* (2013.01)

(56) References Cited

U.S. PATENT DOCUMENTS

| | | | |
|---|---|---|---|
| 7,128,765 B2 | 10/2006 | Paulot et al. | |
| 7,479,347 B2 | 1/2009 | Yeo et al. | |
| 8,968,899 B2 | 3/2015 | Kim et al. | |
| 2004/0031142 A1* | 2/2004 | Paulot | H01M 2/0202 29/623.2 |
| 2007/0009798 A1* | 1/2007 | Inagaki | C01G 23/005 429/231.1 |

FOREIGN PATENT DOCUMENTS

| | | |
|---|---|---|
| KR | 100508947 | 8/2005 |
| KR | 101009705 | 1/2011 |
| KR | 101117993 | 2/2012 |

* cited by examiner

FIG. 10

CLOSURE SYSTEM FOR THE ELECTROLYTE FILL PORT OF AN ELECTROCHEMICAL CELL

BACKGROUND OF THE INVENTION

1. Field of the Invention

The present invention relates to an improvement in the design of an electrochemical cell by enhancing hermeticity of the cell casing. In particular, the present invention is directed to a novel closure system for an electrolyte fill port. The closure system has first and second welded closure members with the first, lower closure member substantially sealing the fill port so that hermeticity of the second, upper closure member is enhanced.

2. Prior Art

In prior and current product lines, the design of a typical electrochemical cell includes a lid with separate ferrules or openings for a terminal pin feedthrough and an electrolyte fill port. Conventional designs consist of a lid or header supporting a glass-to-metal-seal (GTMS) for the terminal pin and a closure system for the electrolyte fill port. The battery electrodes are activated with electrolyte filled into the cell casing via the fill port. Then, the fill port is sealed with a closure system to complete the cell.

One example of an electrolyte fill port closure system is described in U.S. Pat. Nos. 6,610,443 and 7,128,765, both to Paulot et al., and which are assigned to the assignee of the present invention and incorporated herein by reference. The Paulot et al. '443 and '765 patents disclose an electrochemical cell comprising a header assembly containing both a glass-to-metal-seal for a terminal pin and an electrolyte fill port. The fill port comprises upper and lower openings of differing diameters, but in open communication with each other. As shown in FIGS. 8B and 8C of the Paulot et al. patents, a lower sealing member or plug is first mechanically pressed into an interference fit in the lower opening. The lower sealing member is not welded in place. Then, a second sealing member is positioned in the upper opening and welded in place to thereby close the port.

However, merely pressing a sealing plug into a fill port, even one in an interference fit with the opening sidewall, is not always sufficient to prevent leakage of electrolyte from the casing during the final step when the second sealing member is welded in place. There are various reasons for this, among them that variations in dimensions and surface conditions of the lower sealing plug and the fill port sidewall increase the difficulty of precisely controlling the insertion force of the plug into the port. In addition, heat from welding the second sealing member can exacerbate these variations. In some situations, this heat can compromise the temporary seal afforded by the lower sealing member, thereby allowing outgassing byproducts from the electrolyte to compromise the weld for the second sealing member.

In that respect, a new sealing system for the electrolyte fill port of an electrochemical cell is desired.

SUMMARY OF THE INVENTION

Accordingly, the present invention will be described with respect to an exemplary electrochemical cell comprising plate electrodes that are housed inside mating "clamshell" casing components. A lid or header assembly is supported in one or both of the mating clamshells. The header in turn supports both a hermetic glass-to-metal-seal (GTMS) for a terminal pin and an electrolyte fill port. Alternatively, the GTMS and the electrolyte fill port are not supported by a common lid or header, but, instead, are separately supported by one or both of the clamshells.

A first sealing member is preferably positioned in the electrolyte fill port at a lower position through the thickness of the header. A novel aspect of the present invention is that the fill port is provided with rifling contacting the first sealing member. Rifling helps to rotate and partially deform the first sealing member into a tight-fitting contact with the fill port sidewall. The first sealing member is then welded in position within the fill port using a first weld energy. A second sealing member is then positioned in the fill port above the first sealing member. The second sealing member is also welded into position, but preferably at a welding energy that is greater than the first welding energy used to weld the first sealing member. The rational is that using a lower welding energy for the first sealing member helps minimize localized heating of the electrolyte immediately adjacent to the fill port. Then, since the first sealing member serves to significantly block any "out-gassing" electrolyte by-products from compromising the integrity of the weld of the second sealing member, a greater welding energy can be used to seal the second member to thereby ensure a robust, hermetically sealed fill port. The shape of the first and second sealing members is not limited; they may comprise a plate, a sphere, or a shaped plug.

The foregoing and additional advantages and characterizing features of the present invention will become clearly apparent upon reading the ensuing description together with the included drawings.

DETAILED DESCRIPTION OF THE PREFERRED EMBODIMENTS

At the outset, it is understood that use of directional terms such as "upper" and "lower" is not intended to limit the scope of the present invention. Instead, those terms are used to describe the orientation depicted in the drawings, but that is not meant to limit an electrochemical cell incorporating an electrolyte fill port according to the present invention to the orientation that is shown.

Turning now to the drawings, FIGS. 1 to 4 illustrate an exemplary electrochemical cell 10 according to the present invention. The exemplary electrochemical cell 10 comprises a header assembly 12 supported by a conductive metal casing 14, such as of stainless steel or titanium. In a preferred embodiment, the header 12 is manufactured by machining, powdered metallurgy, injection molding, or by stamping. The exemplary casing 14 comprises first and second mating clamshell portions 16 and 18. The mating clamshells 12 and 14 are stamped or otherwise formed from sheet metal.

Figure 1:
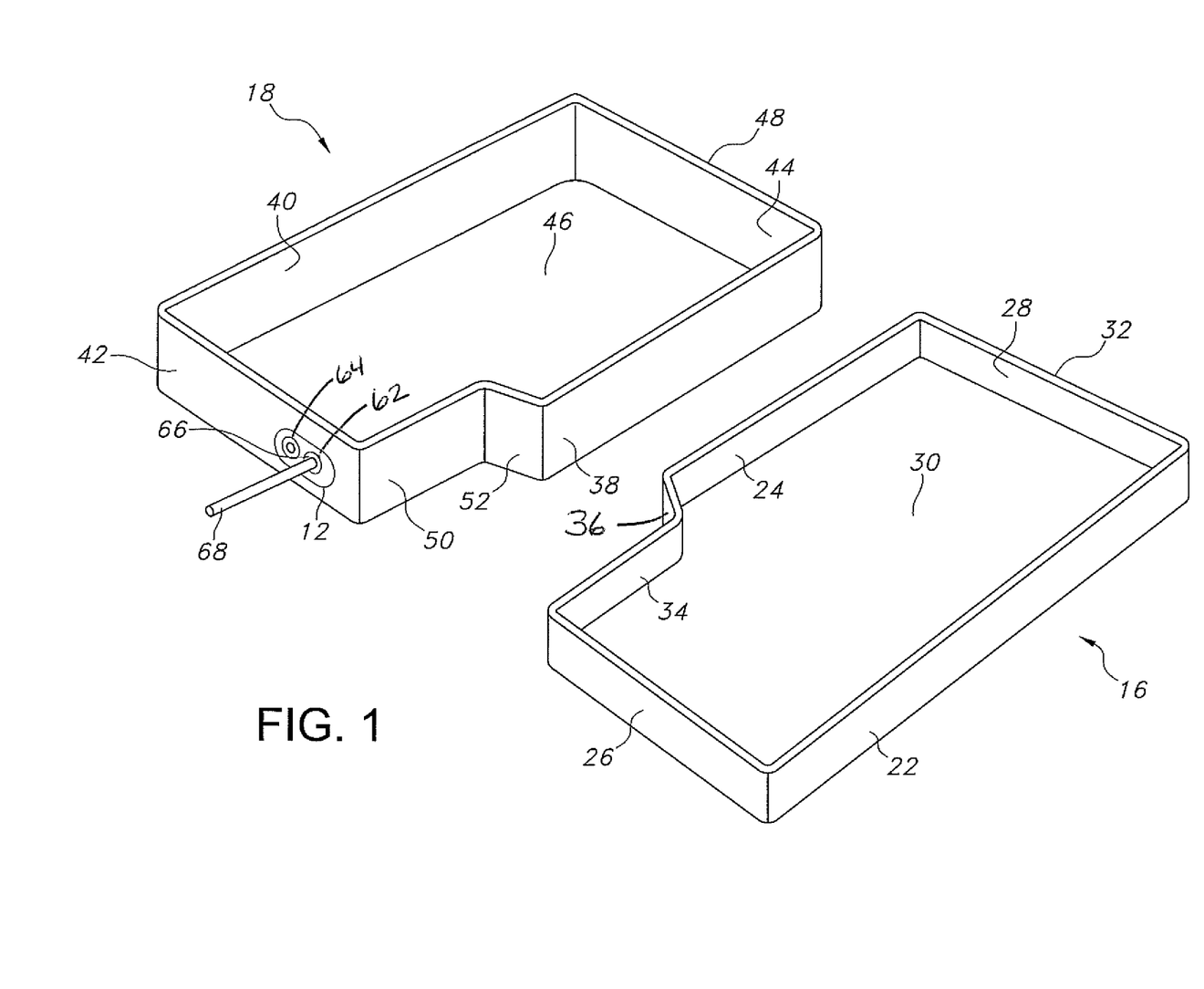
FIG. 1 is a perspective view of a casing comprising mating clamshells 16, 18 for an exemplary electrochemical cell according to the present invention.

First, describing the casing 14, the first clam shell 16 comprises spaced apart sidewalls 22 and 24 extending to and meeting with spaced apart end walls 26 and 28. The sidewalls 22, 24 and the end walls 26, 28 meet each other at rounded corners and extend from a major face wall 30 to a continuous or surrounding edge 32. Side wall 24 has a recess comprising a first portion 34 that extends from end wall 26 and forms into an angled portion 36 of the sidewall wall 24.

The second clam shell 18 comprises spaced apart sidewalls 38 and 40 extending to and connecting with spaced apart end walls 42 and 44. The sidewalls 38 and 40 and end walls 42 and 44 meet at rounded corners and extend from a major face wall 46 to a continuous or surrounding edge 48. Side wall 38 has a recess comprising a first portion 50 that extends from end wall 42 and forms into an angled sidewall portion 52 of the sidewall 38.

Figure 3:
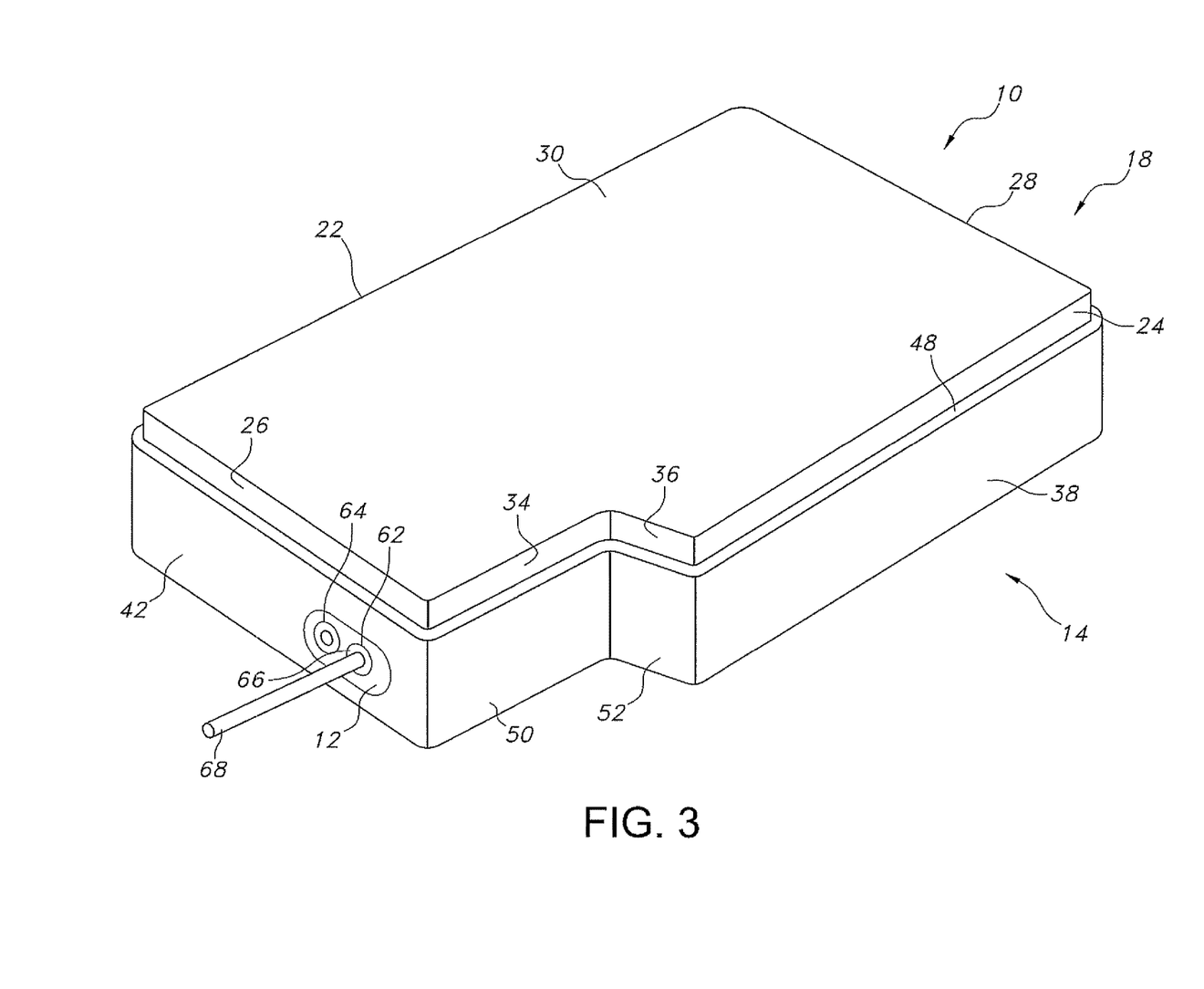
FIG. 3 is a perspective view of the casing 10 shown in FIG. 2 with the clamshells 16, 18 mated to each other.
Figure 4:
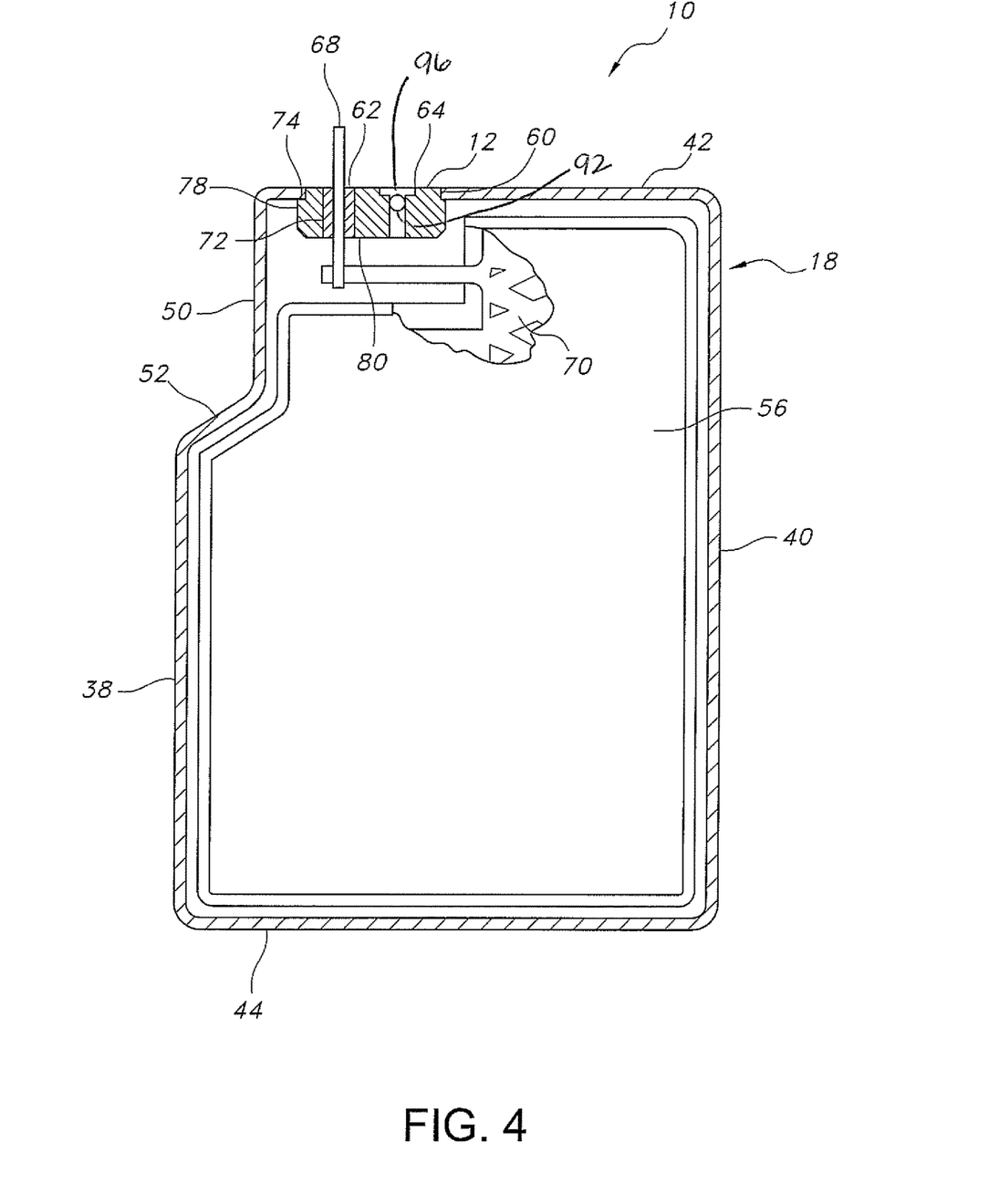
FIG. 4 is a cross-sectional view of the casing 10 shown in FIG. 3.

FIG. 3 illustrates that the first clam shell 16 is sized to fit inside the periphery of the second clam shell 18 in a closely spaced, mated relationship. This means that sidewall 22 is somewhat shorter than sidewall 40, end wall 26 is somewhat shorter than sidewall 42, sidewall 24 is somewhat shorter than sidewall 38, and end wall 28 is somewhat shorter than end wall 44. Also, the first and second portions 34 and 36 of sidewall 24 are sized to be received inside the first and second portions 50 and 52 of sidewall 38. When so mated, the surrounding edge 32 of the first clamshell 16 faces the second major face wall 46 and the second surrounding edge 44 is in a closely spaced relationship with the sidewalls 38, 40 and end walls 42 and 44 of the second clamshell 18.

While not necessarily shown in FIG. 3, the mated clamshells 16 and 18 are sealed together with the surrounding edge 48 of the first clamshell 16 being joined to the sidewalls 38, 40 and end walls 42 and 44 of the second clamshell 18 to provide a hermetic enclosure for the electrode assembly 20. Preferred methods for sealing the clamshells 16 and 18 together include welding and brazing.

Those skilled in the art will appreciate that the recess in sidewall 24 comprising portions 34, 36 mated to the recess in the sidewall 38 comprising portions 50, 52 is not necessary to practice the present invention. However, this shows that the exemplary casing 14 can have an irregular shape so, for example, a component (not shown) of the device intended to be powered by the electrochemical cell 10 can be nested in the recess.

Figure 2:
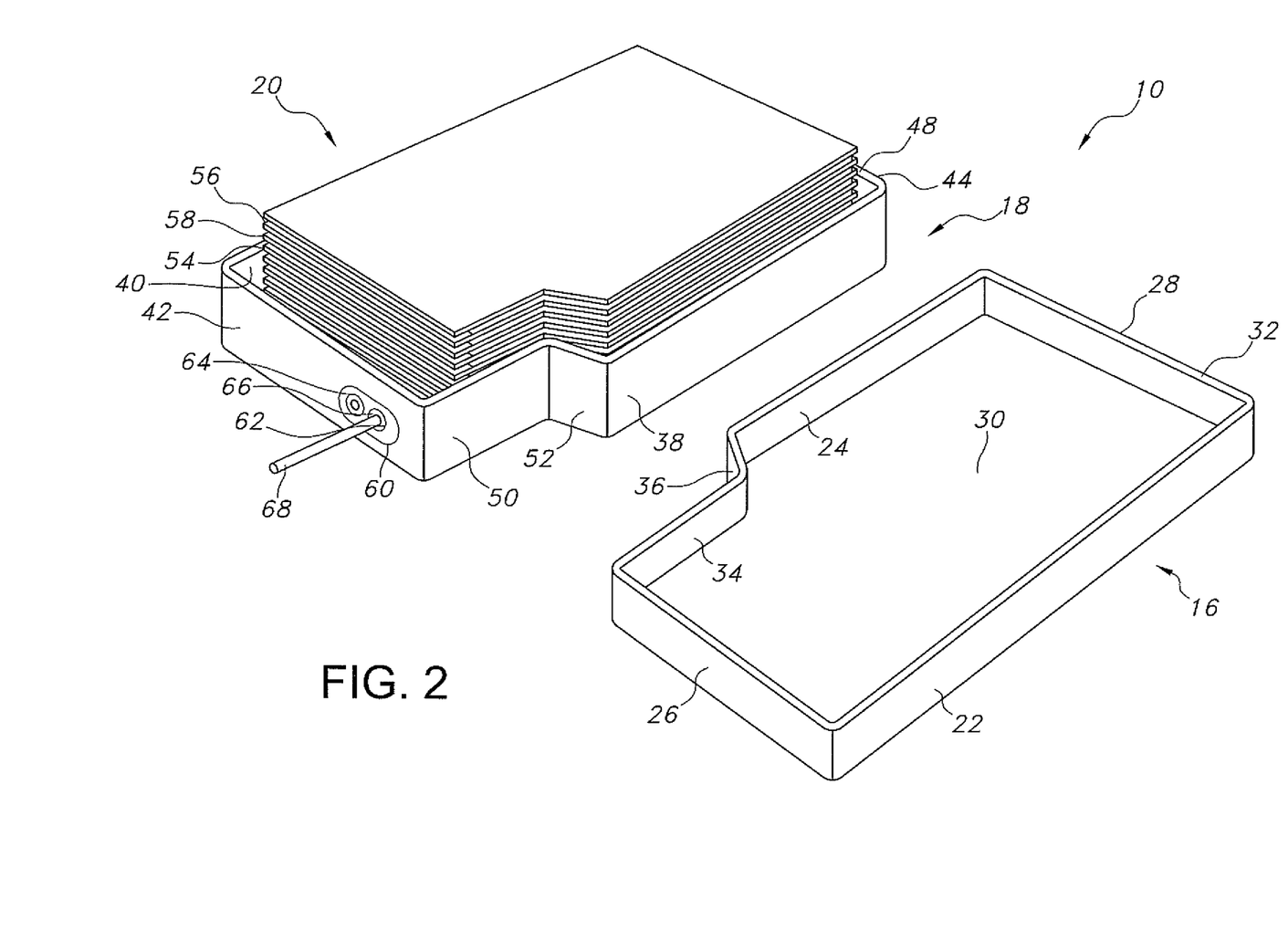
FIG. 2 is a perspective view of the casing shown in FIG. 1 with an electrode assembly 20 nested in clamshell 18.

In FIG. 2, the electrode assembly 20 is shown nested in the second clamshell 18 before that clamshell is mated to the first clamshell 16. The electrode assembly 20 includes an anode, generally designated 54, which comprises an anode active material, such as lithium, pressed to the opposite sides of an anode current collector (not shown). The anode current collector is fabricated from a thin sheet of metal such as nickel. The anode 54 is aligned with a cathode 56 through a thin sheet of separator material 58. The separator surrounds and envelops the cathode 56 to prevent direct physical contact with the anode 54.

As shown in FIGS. 1 to 4, the casing 14 supports the header or lid assembly 12. In the exemplary embodiment shown in the drawings, the end wall 42 of the second clamshell 18 has an opening 60 (FIG. 4) that is sized and shaped to receive the header 12. The header 12 preferably has an ellipsoidal shape and is provided with a first feedthrough opening 62 and a second electrolyte fill port 64. The feedthrough opening 62 receives a hermetic glass-to-metal seal (GTMS) 66 that serves to electrically and conductively isolate a terminal pin 68 connected to a current collector for one of the anode and the cathode from the casing. The drawings show the terminal pin 68 connected to a current collector 70 for the cathode 56 and the GMTS 66 electrically isolating the terminal pin 68 from the casing 14. Electrical isolation is provided by a sealing glass 74 that contacts the header 12 and the terminal pin 68, as is well known by those skilled in the art. The electrolyte fill port 64 is used for filling an electrolyte into the casing 14.

Figure 5:
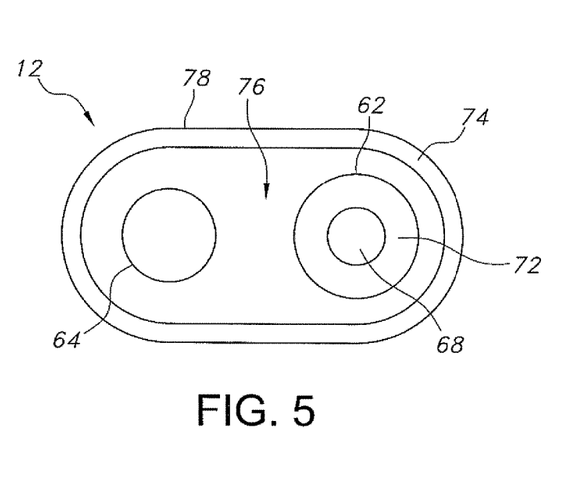
FIG. 5 is a plan view of a header 12 including a feedthrough opening 62 and electrolyte fill port 64 according to the present invention.

As particularly shown in FIG. 5, the header 12 includes a step 74 extending from an upper surface 76 to a sidewall 78. The sidewall 78 meets a lower surface 80 (FIG. 6) at a rounded or beveled edge. The purpose of the step 74 is to assist in locating the header 12 in one of the mating clamshells 16, 18, for example in the opening 60 in the end wall 42 of the second clamshell 18. Preferably, the vertical dimension of the step 74 is equal to the thickness of the casing wall in which the header 12 is supported. That way, the step 74 maintains the header 12 in position so its upper surface 76 is coplanar with the outer surface of the exemplary clamshell sidewall, thereby creating a smooth transition which is desired in most battery designs.

Figure 6:
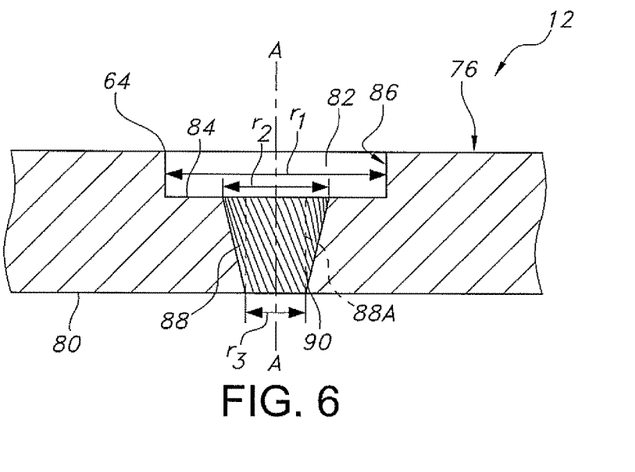
FIG. 6 is a cross-sectional view of the electrolyte fill port 64 shown in FIG. 5.

As shown in FIG. 6, the electrolyte fill port 64 is an opening in the header 12 defined by at least two opening portions of different diameters extending along an axis A-A. In particular, the electrolyte fill port 64 comprises a first opening portion 82 of a fixed radius $r_1$ with respect to axis A-A. The first opening portion 82 extends downwardly from the header upper surface 72 to an intermediate ledge 84 location between the upper surface 72 and the lower surface 80 of the header 12. In a preferred embodiment, the ledge 84 is a planar surface that extends from an interior sidewall surface 86 of the first opening portion 82 toward the axis A-A. The ledge 84 extends annularly around an upper end of a second opening portion 88, which second opening extends downwardly to meet the lower surface 80 of the header 12.

In particular, the second opening portion 86 has a second radius $r_2$ with respect to axis A-A (where $r_1 > r_2$) that begins at the ledge 84 and extends downwardly and inwardly along the axis A-A to a third radius $r_3$ (where $r_2 > r_3$) at the lower surface 80 of the header 12. A frusto-conical shape is preferred for the second opening portion 88, but the present invention is not to be so limited. In one embodiment, the second radius $r_2$ is greater than the third radius $r_3$. In another embodiment depicted in dashed lines 88A, the second opening portion is substantially cylindrical with $r_2$ being equal to $r_3$. In any event, the first and second opening portions 82, 88 or 88A are co-axial and each comprise a curved cross-section, and more specifically, a circular cross-section perpendicular to the axis A-A. A sharp transition where the ledge 84 constricts to the second opening portion 88, 88A is preferred, however, the transition from the ledge 84 to the first opening portion 82 and to the second opening portion 88, 88A may be curved or radiused.

An important aspect of the present invention is that the sidewall delineating or defining the second opening portion 88, 88A is provided with rifling 90 in the form of spiral grooves that extend downwardly from the ledge 84 to the lower surface 80. It is within the scope of the present invention that the rifling can spiral in either a right-hand direction or a left-hand direction with respect to a view looking along axis A-A from the upper surface 76 of the header 12.

Figure 7A:
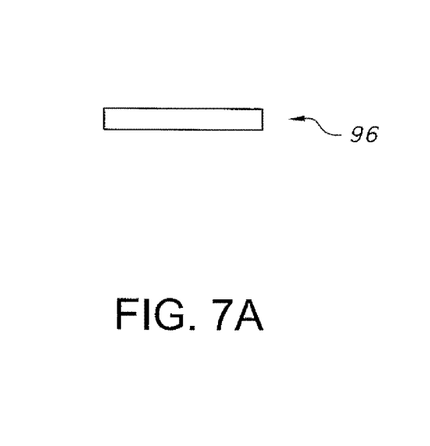
FIG. 7A is a side elevation view of a closure plate 96 according to the present invention.
Figure 7B:
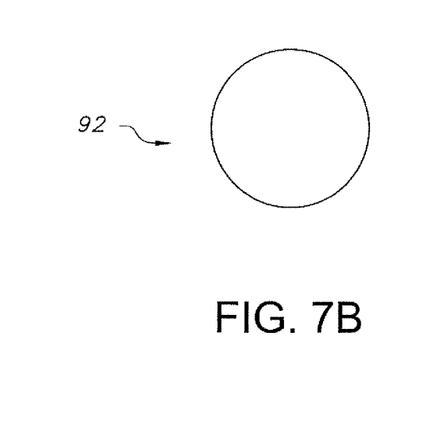
FIG. 7B is a side elevation view of a closure sphere 92 according to the present invention.
Figure 8:
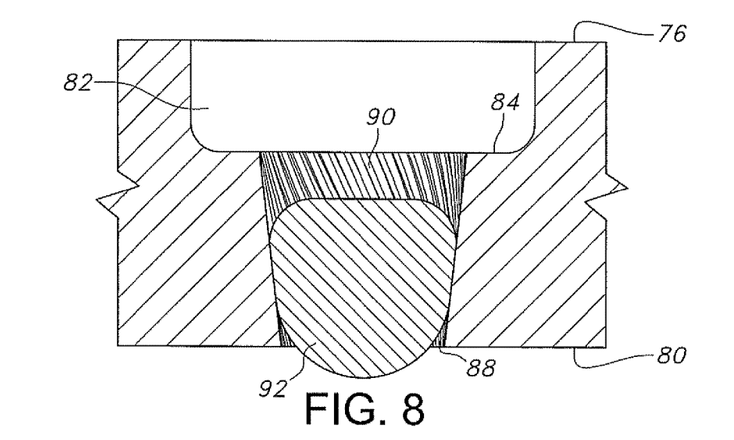
FIG. 8 is a cross-sectional view of the closure sphere 92 shown in FIG. 7B inserted into a lower opening portion 88 of the electrolyte fill port 64 according to the present invention.
Figure 8A:
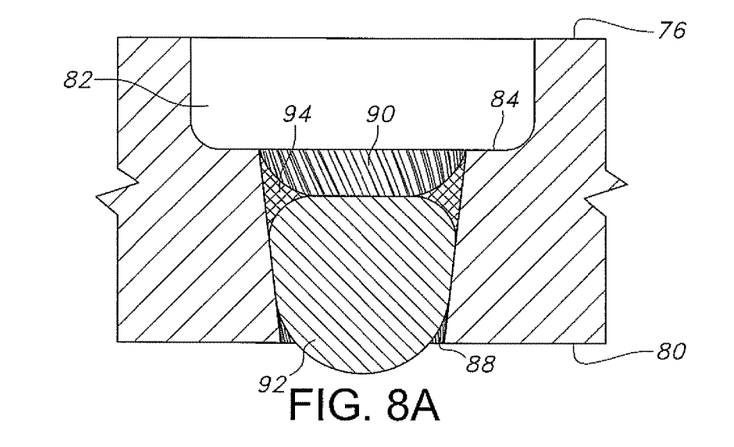
FIG. 8A is a cross-sectional view showing the closure sphere 92 of FIG. 8 having been secured in position by weld 94.

A preferred sealing member for the lower opening portion 88, 88A comprises a round or spherical, metal second sealing member 92 (FIG. 7B) that is inserted into the opening. The sealing member 92 is flush or slightly lower than the ledge 84. In that respect, the second sealing member 92 is force-fit into sealing registry with the rifling 90 and then secured in place by a perimeter weld 94. The rifling 90 serves to rotate the second sealing member 92 as it is force-fit into the second opening portion 88, 88A with the ridges of the spiral grooves cutting gouges into the metal of the sealing member. In that manner, the sealing member 92 is deformed to fill the valleys between adjacent grooves comprising the rifling, which helps register the sealing member in place, substantially closing the second opening 88, 88A. After being welded in place, the second sealing member 92 forms a secondary seal until such time as a primary seal is formed in the first opening portion 82 of the electrolyte fill port 64.

Figure 9:
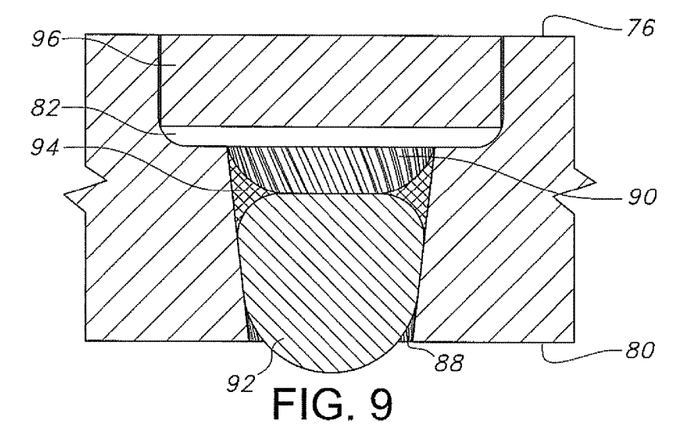
FIG. 9 is a cross-sectional view of the closure plate 96 shown in FIG. 7A inserted into an upper opening portion 82 of the electrolyte fill port 64 according to the present invention.
Figure 9A:
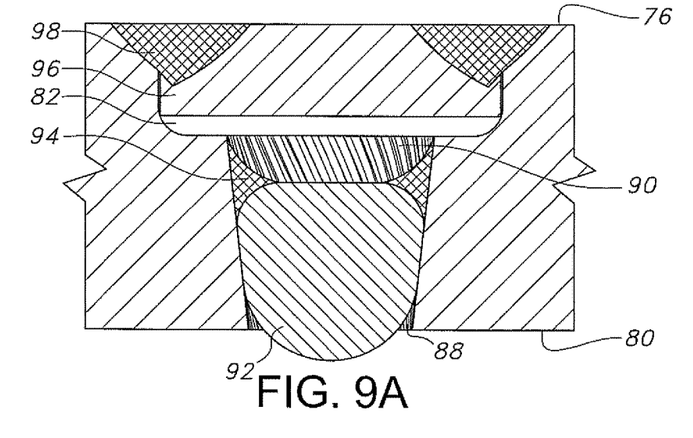
FIG. 9A is a cross-sectional view showing the closure plate 96 of FIG. 9 having been secured in position by weld 98.

To complete the hermetic closure of the electrolyte fill port 64, a second sealing member 96 is installed in the upper or first opening portion 82. The sealing member 96 is preferably plate-shaped having a circular cross-section with a slightly smaller radius than $r_1$. The electrolyte fill port 64 is then hermetically closed when the sealing member 96 is secured to the sidewall 86 defining the upper opening portion with a perimeter weld 98. That way, the second sealing member 92 is in a friction fit contact with the sidewall including the rifling 90 defining the lower opening portion 88, 88A, which helps prevent, if not completely eliminate, electrolyte out-gassing by-products as the plate-shaped metal member 96 is secured in place in the upper opening portion 82 to thereby create a second area of sealing contact at weld 98. In that respect, plate 96 serves as a redundant structure to ensure complete hermeticity at the fill port 64 should there be any pin holes or other imperfection in first weld 94.

In a preferred embodiment, the second weld 98 is formed at a welding energy that is greater than that used to form the first weld 94. The first weld 94 is formed by using a first weld energy capable of joining the ball or sphere 92 to the header 12, but that is not of enough energy to cause the electrolyte material to significantly evolve and expel out of the fill port 64. Furthermore, since the fill port 64 may be positioned in close proximity to the glass-to-metal-seal 66, a lower welding energy is desired so at to not melt or deform the GTMS and potentially compromise its hermeticity. In a preferred embodiment, the first weld 94 is created using a weld energy that ranges from about 1 Joule to about 2 Joules and the second weld 98 is created using a weld energy that ranges from about 1.5 Joules to about 3 Joules.

As previously described and referring back to FIG. 4, the terminal lead 68 connected to the current collector 70 is preferably the positive terminal for the cathode 56. The anode 54 is in operative contact with the conductive casing 14 through direct physical contact of the anode active material to the casing 14 or through an anode current collector (not shown) connected to the mating clamshells 16, 18.

For a typical lithium/silver vanadium oxide cell, the cathode current collector 70 is of titanium, the terminal lead 68 is of molybdenum, and the separator 58 is polypropylene. A suitable activating electrolyte comprises a 1.0M to 1.4M solution of $LiAsF_6$ or $LiPF_6$ in a 50:50 mixture of, by volume, 1,2-dimethoxyethane and propylene carbonate. One suitable sealing glass of glass-to-metal-seal 66 is designated TA-23. The casing clamshells 16, 18 may be of stainless steel, titanium, or other metals. This electrochemical system is of a primary cell type. However, those skilled in the art will readily recognize that the casing 14 is readily adapted to house both primary electrochemical systems of either a solid cathode or liquid catholyte type, or a secondary cell such as a lithium ion cell having a carbonaceous negative electrode and lithium cobalt oxide positive electrode. Other active and non-active materials may be used for other cell chemistries, as are well known by those skilled in the art.

Figure 10:
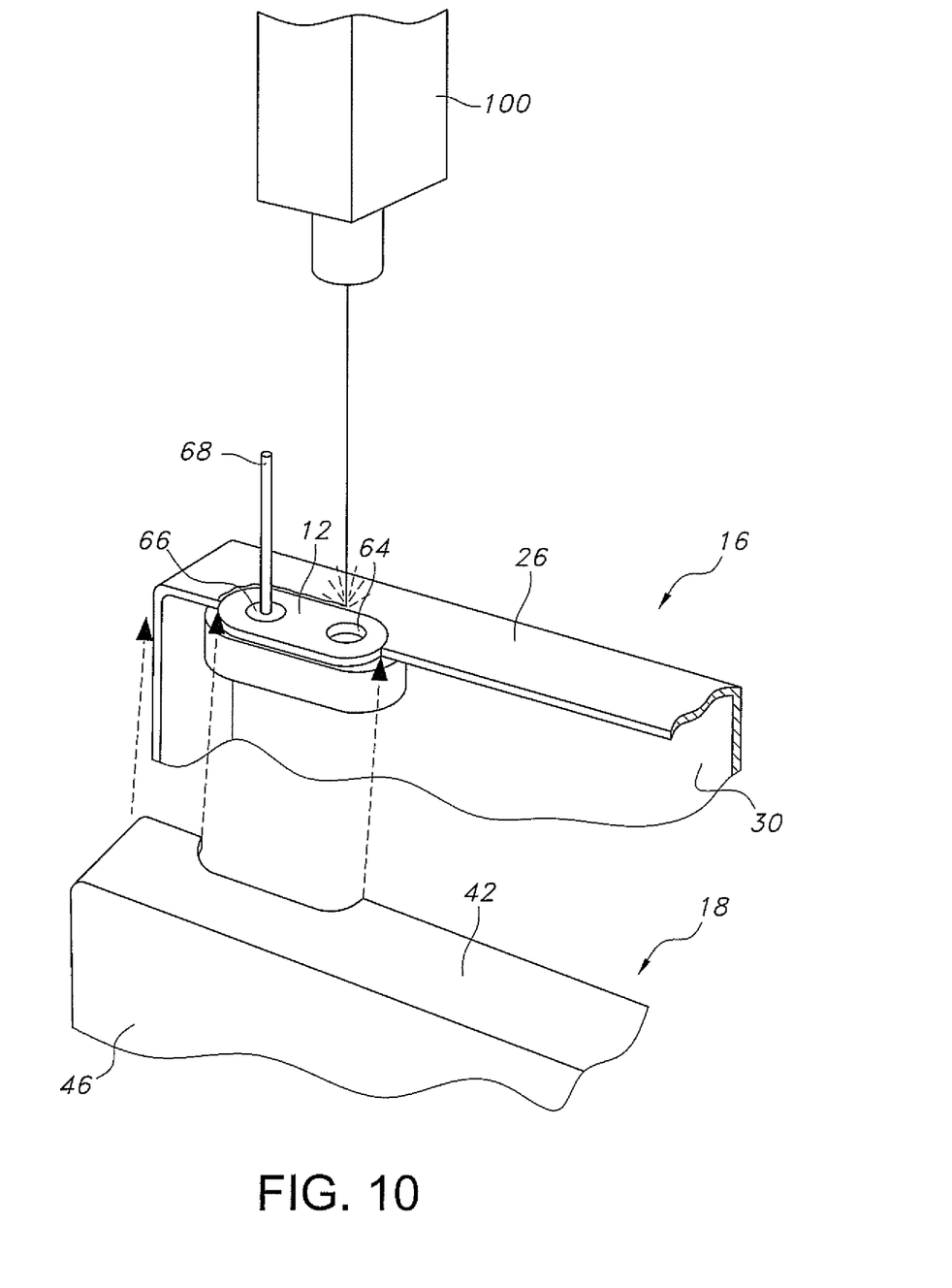
FIG. 10 is a perspective view shown a welding instrument 100 welding the header 12 of the present invention into one of the casing clamshells 16, 18.

In one embodiment, the glass-metal seal 70 with terminal lead 68 is installed in the feedthrough opening 66 of the header 12, and the header is installed in one of the clamshells, for example clamshell 16 and welded in place using a laser welding instrument 100 (FIG. 10). The electrode assembly 20 is nested in one of the clamshells for example, in clamshell 18 (FIG. 2) and the cathode is then connected to the terminal lead 68. This is followed by the first clamshell 16 being mated to the second clamshell 18. The edges of the mated clamshells 16, 18 form a continuous peripheral surface, which is sealed by welding. The assembled casing 14 housing the electrode assembly 20 is then filled with an electrolyte through the fill port 68 and the fill port is sealed shut, creating a hermetically sealed electrochemical cell.

While the present header assembly 12 has been described with respect to a casing of mating clamshells 16, 18, that is for illustrative purposes only. In a broader sense, the present electrolyte fill port construction is useful with any casing designs including prismatic, cylindrical and button shapes.

While preferred embodiments of the present invention have been disclosed, it will be appreciated that the present electrolyte fill port construction is not limited thereto, but may be otherwise embodied with the scope of the following claims.

What is claimed is:

1. An electrochemical cell, which comprises:
 a) a casing comprising a casing sidewall having a casing opening;
 b) a header hermetically sealed to the casing sidewall in the casing opening, the header having a thickness extending from a header upper surface to a header lower surface, wherein the header comprises:
  i) an electrolyte fill port comprising an upper opening sidewall extending from the header upper surface to an intermediate ledge located part-way through the header thickness, the ledge extending from a lower edge of the upper opening sidewall to an upper edge of a lower opening sidewall, the lower opening sidewall extending from the ledge to the header lower surface, and ii) wherein, with respect to an axis of the electrolyte fill port, the upper opening sidewall has a first radius $r_1$ at the header upper surface and the lower opening sidewall has a second radius $r_2$ extending from the ledge to the header lower surface, the first radius $r_1$ being greater than the second radius $r_2$; and iii) rifling extending along the lower opening sidewall from the ledge to the header lower surface;

c) an electrode assembly housed inside the casing, the electrode assembly comprising an anode prevented from direct physical contact with a cathode by an intermediate separator;

d) an electrolyte provided in the casing to activate the electrode assembly; and e) a closure system for the electrolyte fill port, the closure system comprising:
i) a metal member devoid of rifling and serving as a lower closure member secured to the lower opening sidewall comprising the rifling by a lower weld; and
ii) an upper closure member secured to the upper opening sidewall by an upper weld.

2. The electrochemical cell of claim 1, wherein the upper closure member is a metal plate and the lower closure member is a round or spherical metal member.

3. The electrochemical cell of claim 1, wherein the rifling spirals in either a right-hand direction or a left-hand direction with respect to a view looking along the axis of the electrolyte fill port from the header upper surface to the header lower surface.

4. The electrochemical cell of claim 1, further comprising a feedthrough opening supporting a feedthrough, the feedthrough comprising a terminal pin supported by an insulating material sealing between the feedthrough opening and the terminal pin, wherein the terminal pin extends from a terminal pin distal end located outside the casing to a terminal pin proximal end conductively connected to one of the anode and the cathode, and wherein the other of the anode and the cathode is conductively connected to the casing.

5. The electrochemical cell of claim 4, wherein the feedthrough opening is provided in the header.

6. The electrochemical cell of claim 1, of either a primary or a secondary chemistry.

7. An electrochemical cell, which comprises:
a) a casing comprising a casing sidewall having a casing opening;
b) a header hermetically sealed to the casing sidewall in the casing opening, the header having a thickness extending from a header upper surface to a header lower surface, wherein the header comprises:
i) an electrolyte fill port comprising an upper opening sidewall extending from the header upper surface to an intermediate ledge located part-way through the header thickness, the ledge extending from a lower edge of the upper opening sidewall to an upper edge of a lower opening sidewall, the lower opening sidewall extending from the ledge to the header lower surface, and
ii) wherein, with respect to an axis of the electrolyte fill port, the upper opening sidewall has a first radius $r_1$ at the header upper surface and the lower opening sidewall has a second radius $r_2$ at the ledge, the first radius $r_1$ being greater than the second radius $r_2$, and wherein the lower opening sidewall extends downwardly and inwardly along the axis from the second radius $r_2$ at the ledge to a third radius $r_3$ at the header lower surface, the second radius $r_2$ being greater than the third radius $r_3$; and iii) rifling extending along the lower opening sidewall from the ledge to the header lower surface;

c) an electrode assembly housed inside the casing, the electrode assembly comprising an anode prevented from direct physical contact with a cathode by an intermediate separator;

d) an electrolyte provided in the casing to activate the electrode assembly; and e) a closure system for the electrolyte fill port, the closure system comprising:
i) a metal member devoid of rifling and serving as a lower closure member secured to the lower opening sidewall comprising the rifling by a lower weld; and
ii) an upper closure member secured to the upper opening sidewall by an upper weld.

8. The electrochemical cell of claim 7, wherein the lower opening sidewall has a frusto-conical shape extending downwardly and inwardly along the axis of the electrolyte fill port from the second radius $r_2$ at the ledge to the third radius $r_3$ at the header lower surface.

9. The electrochemical cell of claim 7, of either a primary or a secondary chemistry.

10. The electrochemical cell of claim 7, wherein the upper and lower opening sidewalls define respective upper and lower coaxial openings.

11. The electrochemical cell of claim 7, wherein the upper closure member is a metal plate and the lower closure member is a round or spherical metal member.

12. The electrochemical cell of claim 7, wherein the upper and lower closure members are composed of a metallic material selected from the group consisting of titanium, nickel, copper, MP35N, and combinations thereof.

13. The electrochemical cell of claim 7, further comprising a feedthrough opening supporting a feedthrough, the feedthrough comprising a terminal pin supported by an insulating material sealing between the feedthrough opening and the terminal pin, wherein the terminal pin extends from a terminal pin distal end located outside the casing to a terminal pin proximal end conductively connected to one of the anode and the cathode, and wherein the other of the anode and the cathode is conductively connected to the casing.

14. The electrochemical cell of claim 13, wherein the feedthrough opening is provided in the header.

15. The electrochemical cell of claim 7, wherein the rifling spirals in either a right-hand direction or a left-hand direction with respect to a view looking along the axis of the electrolyte fill port from the header upper surface to the header lower surface.

16. An electrochemical cell, which comprises:
a) a casing, comprising:
i) a first metal casing member comprising a first surrounding sidewall extending from a first major face wall to a first surrounding edge of the first sidewall; and
ii) a second metal casing member comprising a second surrounding sidewall extending from a second major face wall to a second surrounding edge of the second sidewall;
b) a header supported by at least one of the first and second casing members, the header having a thickness extending from a header upper surface to a header lower surface, wherein the header comprises:

i) an electrolyte fill port comprising an upper opening sidewall extending from the header upper surface to an intermediate ledge located part-way through the header thickness, the ledge extending from a lower edge of the upper opening sidewall to an upper edge of a lower opening sidewall, the lower opening sidewall extending from the ledge to the header lower surface, ii) wherein, with respect to an axis of the electrolyte fill port, the upper opening sidewall has a first radius $r_1$ and the lower opening sidewall has a second radius $r_2$ at the ledge, the first radius $r_1$, being greater than the second radius $r_2$; and iii) rifling extending along the lower opening sidewall from the ledge to the header lower surface;

c) wherein the first surrounding edge of the first sidewall of the first metal casing member faces the second major face wall of the second metal casing member with the second surrounding edge being in a hermetically sealed relationship with the first sidewall to thereby seal the first and second casing members together; and d) an electrode assembly housed inside the casing, the electrode assembly comprising an anode prevented from direct physical contact with a cathode by an intermediate separator;

e) an electrolyte provided in the casing to activate the electrode assembly; and f) a closure system for the electrolyte fill port, the closure system comprising:

i) a metal member devoid of rifling and serving as a lower closure member secured to the lower opening sidewall comprising the rifling by a lower weld; and ii) an upper closure member secured to the upper opening sidewall by an upper weld.

17. The electrochemical cell of claim 16, wherein the lower opening sidewall extends downwardly and inwardly along the axis of the electrolyte fill port from the second radius $r_2$ at the ledge to a third radius $r_3$ at the header lower surface, the second radius $r_2$ being greater than the third radius $r_3$.

18. The electrochemical cell of claim 16, wherein the lower opening sidewall has a cylindrical shape extending downwardly along the axis of the electrolyte fill port from the second radius $r_2$ at the ledge to a third radius $r_3$ at the header lower surface, the second radius $r_2$ being equal to the third radius $r_3$.

19. The electrochemical cell of claim 16, wherein the upper and lower opening sidewalls define respective upper and lower coaxial openings.

20. The electrochemical cell of claim 16, wherein the upper closure member is a metal plate and the lower closure member is a round or spherical metal member.

21. The electrochemical cell of claim 16, wherein the upper and lower closure members are composed of a metallic material selected from the group consisting of titanium, nickel, copper, MP35N, and combinations thereof.

22. The electrochemical cell of claim 16, further comprising a feedthrough opening supporting a feedthrough, the feedthrough comprising a terminal pin supported by an insulating material sealing between the feedthrough opening and the terminal pin, wherein the terminal pin extends from a distal pin end located outside the casing to a proximal pin end conductively connected to one of the anode and the cathode, and wherein the other of the anode and the cathode is conductively connected to the casing.

23. The electrochemical cell of claim 22, wherein the feedthrough opening is provided in the header.

24. The electrochemical cell of claim 16, wherein the rifling spirals in either a right-hand direction or a left-hand direction with respect to a view looking along the axis of the electrolyte fill port from the header upper surface to the header lower surface.

* * * * *